United States Patent Office 2,905,676
Patented Sept. 22, 1959

2,905,676

17-ALKYL-17-HYDROXY-5(10)-ESTREN-3-ONE

Frank B. Colton, Chicago, Ill., assignor to G. D. Searle & Co., Chicago, Ill., a corporation of Delaware No Drawing. Application August 16, 1956
Serial No. 604,326

Claims priority, application New Zealand
August 19, 1955

4 Claims. (Cl. 260—397.4)

This invention relates to new steroids and, more particularly, to 17-alkyl-17-hydroxy-5(10)-estren-3-ones of the structural formula

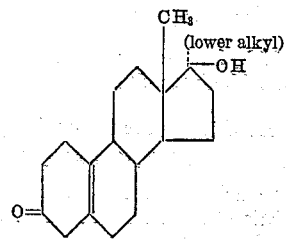

The lower alkyl group in the 17α-position can be a methyl, ethyl, or straight-chain or branched propyl, butyl, pentyl, and hexyl group.

The compounds of this invention are active luteoid hormonal agents useful in the treatment of menstrual disorders. They also inhibit the mineralocorticoid action of desoxycorticosterone. Further, they reduce the serum concentration of cholesterol and particularly the ratio of the concentration of cholesterol and of phospholipids in the serum. The androgenic activity of ordinary doses is negligible.

The compounds of this invention, in addition to being useful in the pharmaceutical and veterinary fields, are likewise useful as intermediates in organic synthesis. Thus, isomerization in the presence of a proton transfer agent such as hydrochloric acid causes a shift of the double bond in ring A to yield the 17-alkyl-19-nortestosterone. But unlike the alkylnortestosterones, these 5(10)-estrene derivatives have little anabolic activity and are not hypotensive.

One of the preferred processes for the manufacture of these compounds comprises the mild acetic hydrolysis of a 3-alkoxy-17α-alkyl-2,5(10)-estradien-17-ol. An alternative procedure utilizes the hydrogenation of the corresponding 17α-alkenyl-17-hydroxy-5(10)-estren-3-ones or 17α-alkynyl-17-hydroxy-5(10)-estren-3-ones.

The compounds and methods of manufacture which constitute this invention will appear more fully from the following examples. In these examples quantities are given in parts by weight and temperatures in degrees centigrade (° C.).

Example 1

A mixture of 10 parts of 17α-ethynyl-3-methoxy-1,3,-5(10)-estratrien-17-ol, 2.5 parts of 5% palladium on charcoal catalyst and 50 parts of dioxane is shaken in contact with a hydrogen atmosphere until 2 molecular equivalents of hydrogen have been consumed. The catalyst is removed by filtration, and the residue remaining after concentration of the filtrate is purified by recrystallization from a mixture of ether and petroleum ether. In this manner there is obtained 17α-ethyl-3-methoxy-1,3,5(10)-estratrien-17-ol melting at about 88–89° C.

A solution of 50 parts of 17α-ethyl-3-methoxy-1,3,-5(10)-estratrien-17-ol in 710 parts of ether is diluted with 2500 parts of liquid ammonia. Throughout the following operations, until the reaction mixture is diluted with water, it is constantly stirred and is maintained at an approximately constant volume by the addition of a total of 2100 parts of ether in portions, to replace the ammonia which is continuously lost by vaporization. The solution of 17α-ethyl-3-methoxy-1,3,5(10)-estratrien-17-ol in ether and liquid ammonia is treated over a period of 35 minutes by the addition of a total of 35 parts of lithium in small portions. After an additional hour, 240 parts of ethanol is added in small portions over a period of 3 hours, and stirring is continued for several hours more. Water (1000 parts) is added, and the ethereal phase is washed with several portions of water, dried and concentrated. The residue obtained by evaporation of the ethereal solution is stirred with a mixture of 200 parts of methanol and 1 part of pyridine, and the resulting suspension is refrigerated for several hours. The crystalline product is collected on a filter and washed with 120 parts of cold methanol. This compound is 17α-ethyl-3-methoxy-2,5(10)-estradien-17-ol melting at about 127–128° C.

A mixture of 1.25 parts of 17α-ethyl-3-methoxy-2,-5(10)-estradien-17-ol, 24 parts of methanol and 4 parts of acetic acid is heated under reflux for 5 minutes. Water (150 parts) is added and the mixture is refrigerated for several hours. The precipitated product is collected on a filter and dried. Recrystallization from a mixture of acetone and petroleum ether affords 17α-ethyl-3-oxo-5(10)-estren-17-ol melting at about 134–136° C.

A mixture of 10 parts of 17α-ethyl-3-oxo-5(10)-estren-17-ol, 160 parts of methanol, 20 parts of water and 7 parts of concentrated hydrochloric acid is stirred for 2 hours at room temperature and is then chilled and allowed to stand at 0° C. for 2 hours. The mixture is filtered from a small amount of insoluble material, and the filtrate is diluted, with constant stirring, with 500 parts of water. The mixture is then cooled to about 0–5° C. and filtered. The crystalline product can be purified by recrystallization from aqueous methanol, or from a mixture of acetone and petroleum ether. In this manner there is obtained 17-ethyl-19-nortestosterone melting at about 140–141° C.

Example 2

To a stirred mixture of 8.5 parts of magnesium in 140 parts of ether there are added 5 parts of allyl bromide in 15 parts of ether. Then, in the course of 45 minutes, a mixture of 20 parts of the methyl ether of estrone and 95 parts of allyl bromide in 630 parts of ether are added. After 3 hours of refluxing the mixture is cooled to 0° C., washed repeatedly with 10% ammonium chloride solution and then with water, dried over anhydrous sodium sulfate, filtered and evaporated. The residue is taken up in ether. The ether solution is partially concentrated and diluted with petroleum ether. The crystalline 17α-allyl-3-methoxy-1,3,5(10)-estratrien-17-ol thus obtained melts at about 91–91.5° C.

A mixture of 11.5 parts of 17α-allyl-3-methoxy-1,3,5 (10)-estratrien-17-ol, 3 parts of charcoal containing 5% palladium and 160 parts of ethanol is hydrogenated until one mole of hydrogen has been absorbed. The mixture is then filtered through filter aid and the filtrate is evaporated under vacuum. The residue is crystallized from a mixture of ether and methanol to yield 17α-propyl-3-methoxy-1,3,5(10)-estratrien-17-ol melting at about 93–94° C.

To a stirred mixture of 6 parts of 17α-propyl-3-methoxy-1,3,5(10)-estratrien-17-ol in 500 parts of ammonia and 140 parts of ether, 7 parts of lithium are added in the course of 20 minutes. The mixture is stirred for 30 minutes after which 46 parts of ethanol are added dropwise in the course of an hour. Stirring is continued until all of the ammonia has disappeared. Then water is added and the ether layer is separated, washed with water, dried over anhydrous sodium sulfate, filtered and evaporated. Crystallization from a mixture of ether in methanol yields 17α-propyl-3-methoxy-2,5(10)-estradien-17-ol melting at about 150–152° C.

A mixture of 18 parts of 17α-propyl-3-methoxy-2,5(10)-estradien-17-ol, 320 parts of methanol and 45 parts of glacial acetic acid is refluxed for 5 minutes and then treated with hot water until the mixture becomes turbid. On chilling there precipitates 17α-propyl-17-hydroxy-5(10)-estren-3-one melting at about 90–91.5° C.

*Example 3*

A stirred solution of 4.2 parts of 17α-methyl-3-methoxy-1,3,5(10)-estratrien-17-ol in 180 parts of ether is treated with 400 parts of liquid ammonia. Then 4 parts of lithium are added in small portions over a period of 30 minutes with stirring. As ether evaporates during this operation it is replaced with fresh ether. Stirring and replacement of ether are continued for 30 minutes. Then 25 parts of ethanol are added in small portions over a period of 3 hours and, after 5 additional hours of stirring, 100 parts of water are added. The ether layer is separated, washed with water, dried and concentrated. The residue is stirred with 20 parts of methanol and the resulting suspension is refrigerated to yield 17α-methyl-3-methoxy-2,5(10)-estradien-17-ol melting at approximately 138–140° C.

A mixture of 0.6 part of 17α-methyl-3-methoxy-2,5(10)-estradien-17-ol, 8 parts of methanol and 1.5 parts of acetic acid is refluxed for 5 minutes and then treated with hot water to incipient turbidity. Upon chilling there precipitates 17α-methyl-17-hydroxy-5(10)-estren-3-one melting at about 144–146° C.

What is claimed is:
1. A compound of the structural formula

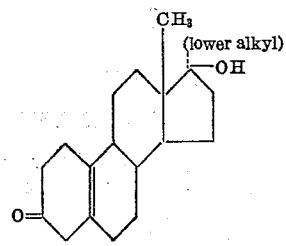

2. A compound of the structural formula

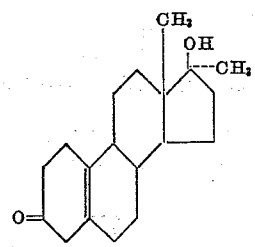

3. 17α-ethyl-17-hydroxy-5(10)-estren-3-one.
4. 17α-propyl-17-hydroxy-5(10)-estren-3-one.

References Cited in the file of this patent
UNITED STATES PATENTS

| | | |
|---|---|---|
| 2,308,835 | Ruzicka | Jan. 19, 1943 |
| 2,374,369 | Miescher | Apr. 24, 1945 |
| 2,698,855 | Hicks | Jan. 4, 1955 |
| 2,721,871 | Colton | Oct. 25, 1955 |

FOREIGN PATENTS

| | | |
|---|---|---|
| 211,488 | Switzerland | Dec. 2, 1940 |